(12) United States Patent
Wilson et al.

(10) Patent No.: US 7,335,006 B2
(45) Date of Patent: Feb. 26, 2008

(54) IN-MOULD LABELLING

(75) Inventors: Simon Wilson, Berkshire (GB); Shaun Ruck, Hertfordshire (GB)

(73) Assignee: Nokia Corporation, Espoo (FI)

(*) Notice: Subject to any disclaimer, the term of this patent is extended or adjusted under 35 U.S.C. 154(b) by 435 days.

(21) Appl. No.: 10/740,035

(22) Filed: Dec. 18, 2003

(65) Prior Publication Data
US 2005/0127565 A1    Jun. 16, 2005

(30) Foreign Application Priority Data
Dec. 12, 2003  (GB) ................................. 0328832.1

(51) Int. Cl.
*B29C 45/14*  (2006.01)

(52) U.S. Cl. .................. 425/112; 425/116; 425/121; 425/125; 425/129.1

(58) Field of Classification Search ................ 425/112, 425/116, 120, 121, 125, 129.1, 127
See application file for complete search history.

(56) References Cited

U.S. PATENT DOCUMENTS

| | | | | |
|---|---|---|---|---|
| 2,304,984 A | * | 12/1942 | Wood | 264/275 |
| 3,403,883 A | * | 10/1968 | Simko | 249/95 |
| 3,971,841 A | * | 7/1976 | Rubinstein | 264/275 |
| 4,162,138 A | * | 7/1979 | Byrne | 425/125 |
| 4,491,556 A | * | 1/1985 | Fujii et al. | 264/243 |
| 4,806,094 A | * | 2/1989 | Rhodes et al. | 425/543 |
| 5,236,657 A | * | 8/1993 | Waldenrath et al. | 264/510 |
| 5,360,588 A | * | 11/1994 | Heyn et al. | 264/153 |
| 5,406,699 A | * | 4/1995 | Oyama | 29/827 |
| 5,575,056 A | * | 11/1996 | Nakagawa | 29/527.4 |
| 5,618,567 A | * | 4/1997 | Hara et al. | 524/111 |
| 5,762,852 A | * | 6/1998 | Hettinga | 264/251 |
| 5,897,823 A | * | 4/1999 | Davis et al. | 264/266 |
| 6,846,169 B2 | * | 1/2005 | Kobayashi et al. | 425/120 |

FOREIGN PATENT DOCUMENTS

| | | | |
|---|---|---|---|
| DE | 4033297 A1 | | 5/1991 |
| DE | 19949576 A1 | | 4/2000 |
| EP | 343755 A2 | * | 11/1989 |
| EP | 1127673 A1 | | 8/2001 |
| FI | 5838 U | | 6/2003 |
| JP | 56067235 A | * | 6/1981 |
| JP | 59215842 A | | 12/1984 |
| JP | 61172714 A | | 8/1986 |
| JP | 05008251 A | * | 1/1993 |
| JP | 06126773 A | | 5/1994 |

* cited by examiner

*Primary Examiner*—Robert B. Davis
(74) *Attorney, Agent, or Firm*—Harrington & Smith, PC

(57) ABSTRACT

An In-Mould Labelling process comprising: clamping a label within a mould void of an injection moulding tool; and injecting material into the mould void while the label is clamped. An In-Mould Labelling process comprising: placing a label between a first mould void and a second, separate mould void; and injecting material into the first and second mould voids.

20 Claims, 6 Drawing Sheets

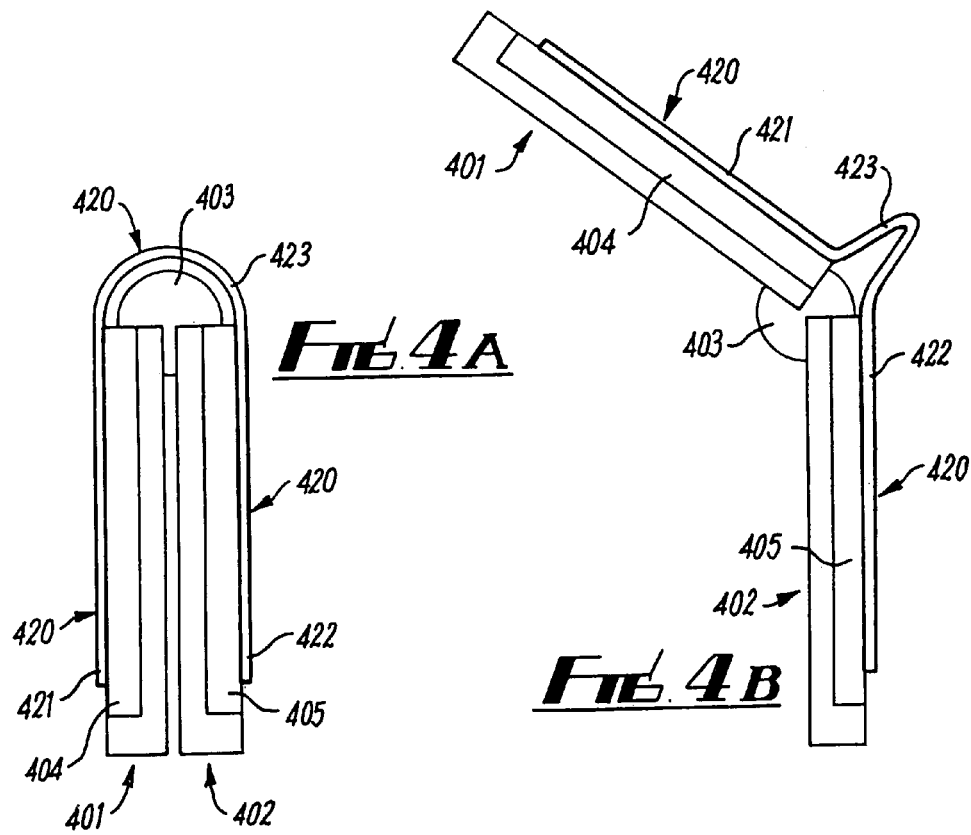
FIG. 4A
FIG. 4B
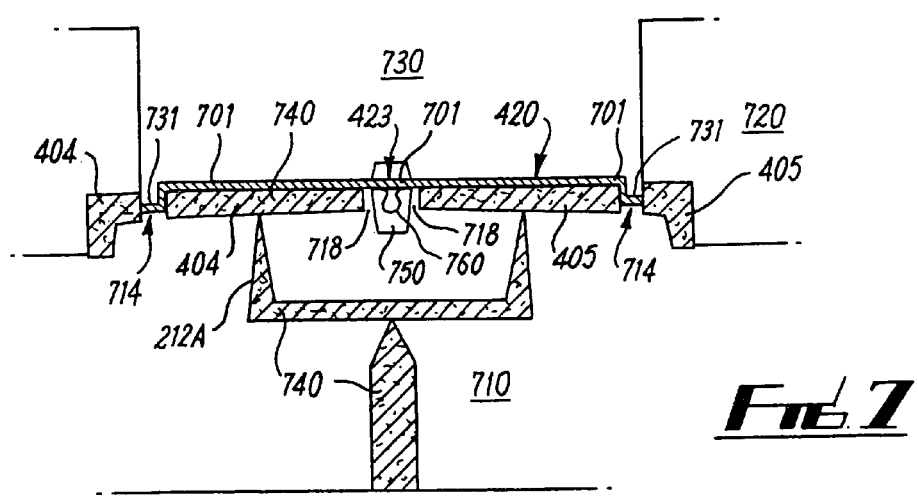
FIG. 7

IN-MOULD LABELLING

BACKGROUND TO THE INVENTION

Embodiments of the present invention relate to In-Mould Labelling. In particular, embodiments relate to Fabric In-Mould Labelling.

Users of radio telephones and other portable devices may want to change the appearance of their device by replacing its housing or cover with another of a different appearance. Such replaceable covers include in-mould decorated covers.

The in-mould labelling (IML) process typically involves the following steps. First, the desired pattern is printed on a film, then, the printed film is thermo-formed into the desired three-dimensional shape i.e. the cover or housing of a radio telephone. Next, a pre-form is cut from the shaped film and is placed in a mould tool and held in place using vacuum suckers. Then polymer is injected into the mould cavity and bonded with the pre-form. The result is a decorated moulded article.

It would be desirable to provide a greater variety of coverings for articles. It would, for example, be desirable to provide fabric coverings.

Finish Utility model 5838, granted 30$^{th}$ Jun. 2003, describes a technique for forming a fabric-covered article using the In-Mould Label (IML) process. This technique may conveniently be referred to as the Fabric In-Mould Label process. In this process, fabric is laminated to a film, which may be a polymer film. The laminate is thermo-formed into a 3D shape. A pre-form label is then cut from the formed laminate and placed into an injection moulding tool. Material such as plastics or polymer is injected into the mould and adheres to the film portion of the laminate pre-form. The result, an In-Mould Label (IML), is a moulded article with the fabric surface of the label pre-form over at least part of one or more surfaces.

There are various problems associated with the FIML process. One problem is how to accurately locate the fabric label within the injection moulding tool without marking or damaging the fabric. Another problem is how to create a pre-form in a manner that does not form an undesirable artefact in the finished article such as marks on the fabric from cutting and an irregular boundary to the edge of the fabric.

FIELD OF THE INVENTION

According to one embodiment of the invention there is provided an In-Mould Labelling process comprising: clamping a label within a mould void of an injection moulding tool; and injecting material into the mould while the label is clamped. The clamping may involve a plurality of resiliently biased clamping members that extend at least partially into the mould void while clamping the label.

This allows a fabric label to be accurately located within an injection moulding tool without marking or damaging the fabric.

According to another embodiment of the invention there is provided an In-Mould Labelling apparatus comprising: a multi-portion body defining a mould void and at least one conduit for injecting material into the mould void; and a plurality of clamping members extending at least partially into the mould void for clamping a label within the mould void.

According to another embodiment of the invention there is provided a moulded article having an exterior surface, the article comprising: an injection moulded body having a plurality of slots extending through the body; and a label that extends over at least a portion of the exterior surface of the article, wherein portions of the label are received within the slots.

According to another embodiment of the invention there is provided a moulded article having an exterior surface, the article comprising: an injection moulded body comprising a groove; and a label comprising a plurality of edges, wherein the label extends over at least a portion of the exterior surface of the article and the edges of the label are received within the groove.

According to another embodiment of the invention there is provided an article comprising: a first injection moulded part having a plurality of first slots extending through the first injection moulded part; a second injection moulded part having a plurality of second slots extending through the second injection moulded part; and a label that extends over at least a portion of the first injection moulded part and a portion of the second injection moulded part, wherein portions of the label are received within the first slots and within the second slots.

According to another embodiment of the invention there is provided an In-Mould Labelling apparatus comprising: a multi-portion body defining a first mould void and at least one conduit for injecting material into the first mould void, a second mould void and at least one conduit for injecting material into the second mould void; and means for placing a label so that it extends from the first mould void to the second mould void.

According to another embodiment of the invention there is provided an In-Mould Labelling process comprising: placing a label between a first mould void and a second, separate mould void; and injecting material into the first and second mould voids.

According to another embodiment of the invention there is provided a laminate label for use in an injection moulding process comprising a substrate layer and a fabric layer.

According to another embodiment of the invention there is provided a method of forming a pre-form label for use in an in mould labelling process comprising: moulding a laminate comprising a substrate layer and a fabric layer to indent a continuous portion of the laminate; and cutting the laminate so that it terminates at the continuous indented portion.

The indentation of the continuous indented portion allows the cut edge of the label to be hidden from view in a finished article. Thus visible artefacts in the finished article are avoided.

BRIEF DESCRIPTION OF THE DRAWINGS

Embodiments of the present invention will now be described, by way of example, with reference to the accompanying drawings, of which:

FIGS. 4A and 4B illustrate, in side view, a two-part electronic device according to an embodiment of the invention having a continuous fabric surface over both parts;

FIG. 7 is a fabric in-mould label tool for manufacturing an electronic device such as that shown in FIGS. 4A and 4B with a fabric wrap.

DETAILED DESCRIPTION OF EMBODIMENTS OF THE INVENTION

Embodiments of the invention use the Fabric In-Mould Label process. In this process, fabric is laminated to a film, which may be a polymer film. The laminate may be thermoformed into a 3D shape. A label is then cut from the laminate and placed into an injection moulding tool. The label may be two-dimensional or, if the laminate was formed, a three-dimensional pre-form. Material such as plastics or polymer is injected into the mould and adheres to the film portion of the laminate pre-form. The result, an In-Mould Label (IML), is a moulded article with the fabric surface of the label pre-form over at least part of one or more surfaces.

Figure 1A:
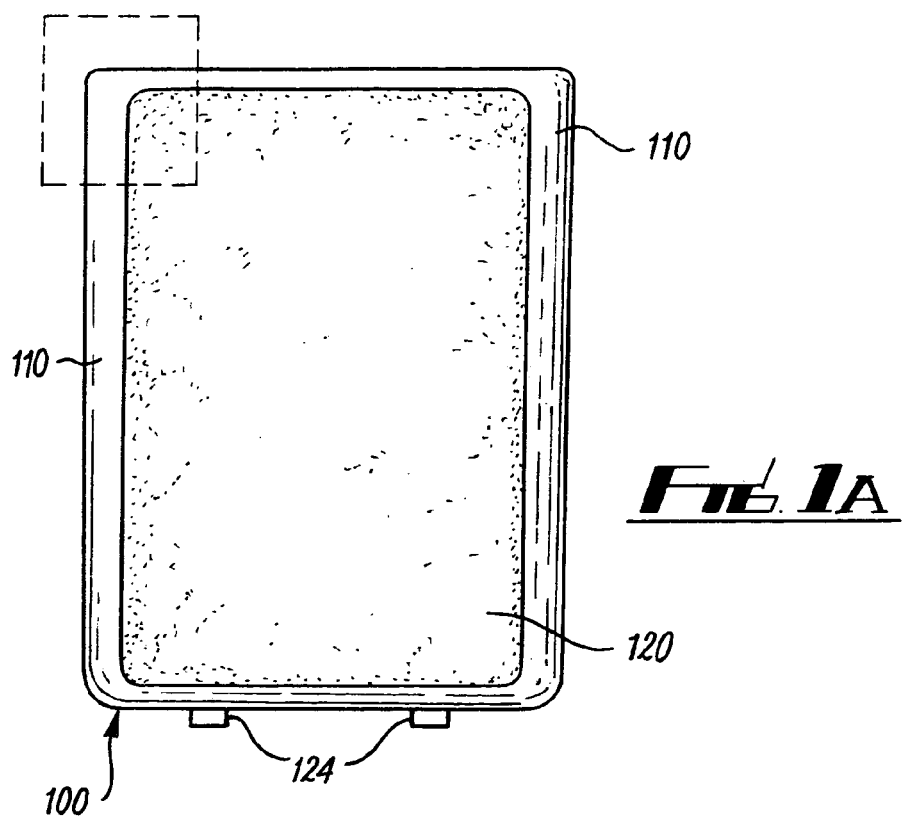
FIG. 1A is a front plan view of a battery cover with fabric in-mould label according to an embodiment of the present invention.

FIG. 1A illustrates a battery cover for an electronic device such as a radio telephone formed using the FIML process. The battery cover 100 is a FIML comprising polymer 110 and a fabric laminate 120. The fabric laminate 120 may, for example, be 0.8 millimetre thick Alcantara bonded to 0.2 millimetre polycarbonate/ABS film using a polyurethane thermobond adhesive. The cover 100 comprises location tabs 124 formed from the polymer 110, which, in use, correspond to recesses in the body portion of the electronic device to position the cover with respect to the body portion.

Figure 1B:
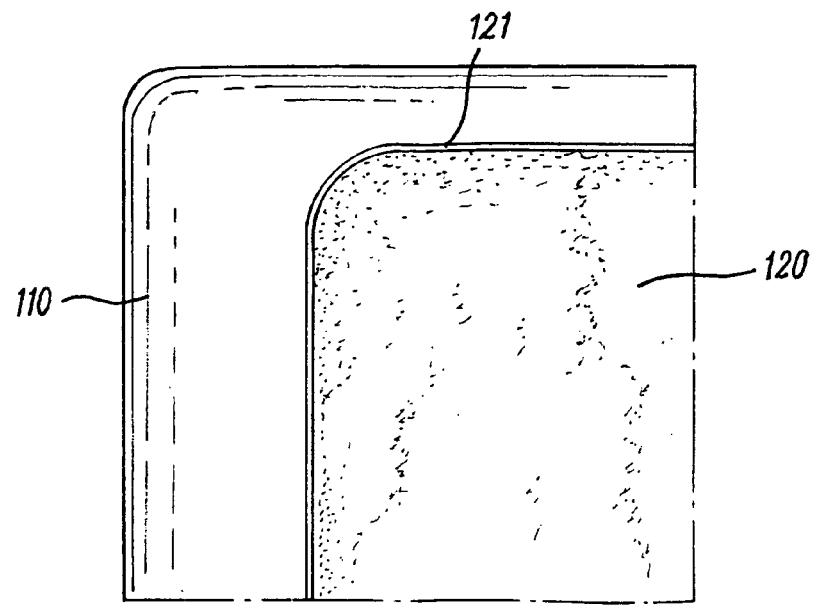
FIG. 1B is close-up plan view of a portion of the cover illustrated in FIG. 1A.

FIG. 1B is a close-up plan view of the left hand top corner of FIG. 1A indicated by dotted lines. From FIG. 1B, it can be seen that the cover 100 has a continuous groove 121 running along the interface between the polymer 110 and the edge of the fabric 120. This groove can be more clearly seen from the rear view of the cover illustrated in FIG. 1C and the corresponding cross-sections A-A and B-B shown in FIGS. 1D and 1E respectively. The groove 121 receives the edge of the fabric laminate 120 within it. The edge is placed at the bottom of the groove 121. The grove thus conceals the edge of the fabric 120.

Figure 1C:
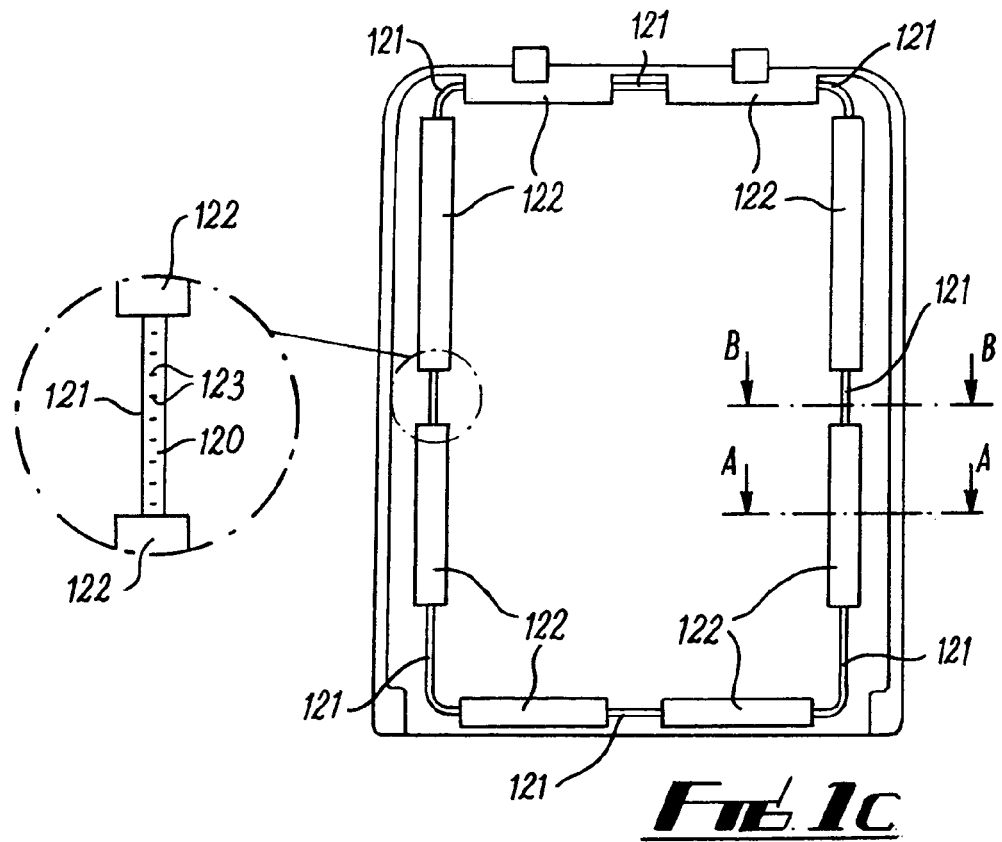
FIG. 1C is a rear plan view of the battery cover of FIG. 1A.
Figure 1D:
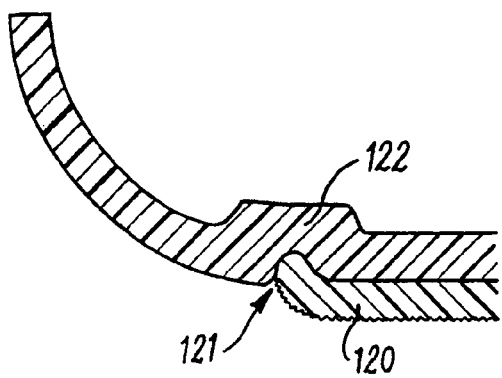
FIG. 1D illustrates a cross-section of the battery cover along the line A-A of FIG. 1D.
Figure 1E:
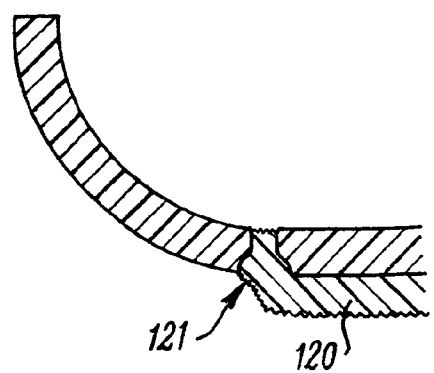
FIG. 1E illustrates a cross-section of the battery cover along the line B-B of FIG. 1D.

FIG. 1D illustrates the cross-section of a portion of the groove 121 that has a base defined by a wall-strengthening portion 122. The provision of the wall-strengthening portion 122 enables the polymer to have a constant thickness d of one millimetre (+/−0.1 millimetre) along the line A-A. As can be seen, in this embodiment, eight portions of the groove have wall-strengthening portions 122 at their base, two along each side of the cover 100. Between these portions, the groove does not have a base and forms a slot opening through the polymer 110 of the cover 100, as illustrated in FIG. 1C and the cross-section along line B-B shown in FIG. 1E. The fabric within these slot openings has gripper orifices 123. Such gripper orifices 123 are formed as the result of the provision of teeth 301 piercing the fabric laminate to hold it securely in position during construction of the cover 100 (see FIGS. 2 and 3 and the corresponding description below).

Figure 2A:
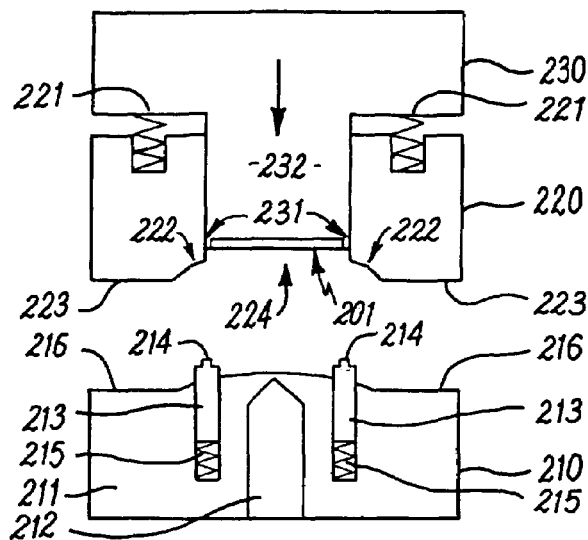
FIGS. 2A, 2B and 2C illustrate a section through a cavity label location system for manufacturing an electronic device cover having a fabric in-mould label, such as the battery cover of FIG. 1A.
Figure 2B:
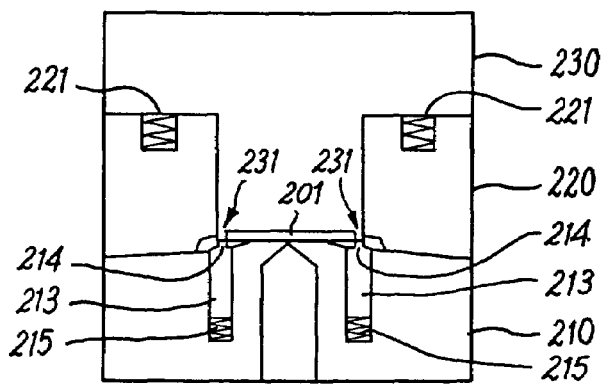
Figure 2C:
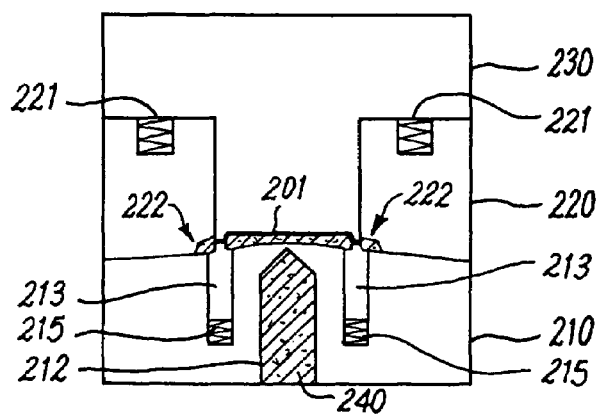
Figure 3:
FIG. 3 illustrates the provision of teeth in the mould tool to secure the fabric label during the manufacturing process, and the resultant cover.

FIGS. 2A, 2B and 2C illustrate a cross-sectional view through the tool of a cavity label location system. The tool is particularly suitable for 2D and 2.5D labels. The tool comprises a label location core 230, mould cavity 220 and mould core 210. Mould core 210 is fixed and separate from the label location core 230 and the mould cavity 220. The label location core 230 has a locating portion 232 that extends through an opening 224 in the mould cavity 220. The label location core 230 and mould cavity 220 move together towards the mould core 210. When the mould cavity 220 abuts the mould core 210, the label location core moves relative to the mould cavity 220 and the locating portion moves within the opening 224.

The mould core 210 comprises a main body 211 and an injection barrel 212 within the main body 211, as is conventional in in-mould label (IML) tools. However, the moulded core also has clamping ribs 213. Each clamping rib 213 has, in this example, a projection 214 at an end facing the mould cavity 220 and a resilient member 215 at its other end, which serves to resiliently bias the clamping rib 213 towards the mould cavity 220. As FIG. 2 is a section of the whole tool, it only illustrates two clamping ribs. However, as will be appreciated by a person skilled in the art, the tool for providing a cover such as that in FIG. 1 will typically comprise a clamping rib for each slot opening 121: that is eight ribs in total.

The mould cavity 220 is sized to receive a trimmed fabric laminate label 201 of desired shape within its opening 224. The fabric laminate label 201 is typically a fabric laminate, such as that shown in FIG. 1A (referenced 120). In this embodiment, the surface of the mould cavity 220 facing the mould core 210 has cut-outs 222 which provide a mould surface for a particular shape of cover. Resilient members 221 are provided between the mould cavity 220 and label location core 230 to resiliently bias the mould cavity 220 towards the mould core 210.

The label locating core 230 is movable and has a locating portion 232 with projections 231 adjacent the edge of the opening 224 and toward the mould core 210.

FIG. 2A illustrates the tool after a laminate label 201 has been placed in it. The mould cavity 220 and label locating core 230 have a first configuration, in which the mould cavity 220 is biased towards the mould core 210 by resilient member 221. The locating portion 232 of the locating core is retracted within the opening 224 of the mould cavity forming a recess that receives the laminate label 201. The laminate label 201 is positioned within the recess, so that it abuts the projections 231 of the locating portion 232 of the label location core 230. The recess holds the label in a desired position.

FIG. 2B illustrates the clamping of the laminate label 201 into position. The label location core 230 is moved towards the mould core 210. The label location core 230 and mould cavity 220 move together towards the mould core 210 with the label 201 positioned with the recess. The resilient members 221 contact the label 201 holding it against the projections 231. Then as the label location core 230 continues to move, the respective opposing faces 223 and 216 of the mould cavity 220 and mould core 210 contact each other.

Continued force applied to the label location core acts against the resilient members 221 so that the locating portion 232 of the label location core 230 moves towards the mould core and extends from the opening 224 of the mould cavity 220, thereby reducing the cavity housing the laminate label 201 and pushing the laminate label 201 towards the front of the mould cavity 220. Resilient members 215 are likewise compressed, resulting in the clamping ribs 213 withdrawing into the mould core 210. However, opposing forces between the clamping ribs 213 of the mould core 210 and the projections 231 of the label location core 230 enable the laminate label 201 to be clamped as the label is moved into position and while it is in position.

FIG. 2C illustrates the injection of the polymer into the tool. With force still applied to the label location core 230, a polymer is injected into the tool via injection barrel 212 until the polymer has filled the space between the label location core 230, mould core 210 and the mould cavity 220 pressing the laminate label 201 against the end of the locating portion 232 of the label location core 230. That is, until the polymer has filled the space defined, on the one side, by the surfaces of the laminate label 201 and mould cavity cut-outs 222, and, on the other side, by the opposing surfaces of the mould core 210 and clamping ribs 213. The label is thus 'formed' in-situ, with its edges encapsulated with the groove 121. The polymer bonds with the laminate label 201, and they become, as a combination, the desired moulded cover. The label location core 230 is then moved away from the mould core. This results in the resilient members 215 returning to their unbiased states, thereby causing the clamping ribs 213 to extend once again from the mould core 210 and in effect acting as ejectors for the moulded cover. The laminate label 201 is compressed during moulding but recovers after removal from the tool.

Operation of the cavity label location system tool is automated, as is the insertion of a fabric laminate label 201 into the tool and the removal of the resultant moulded cover from it. The fabric laminate labels are supplied in a magazine.

Figure 5:
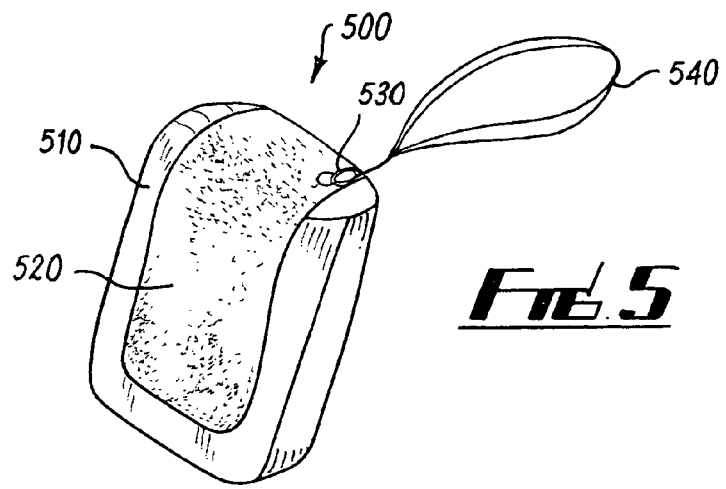
FIG. 5 is a front perspective view of a two part electronic device such as that of FIGS. 4A and 4B, shown in the closed position.
Figure 6:
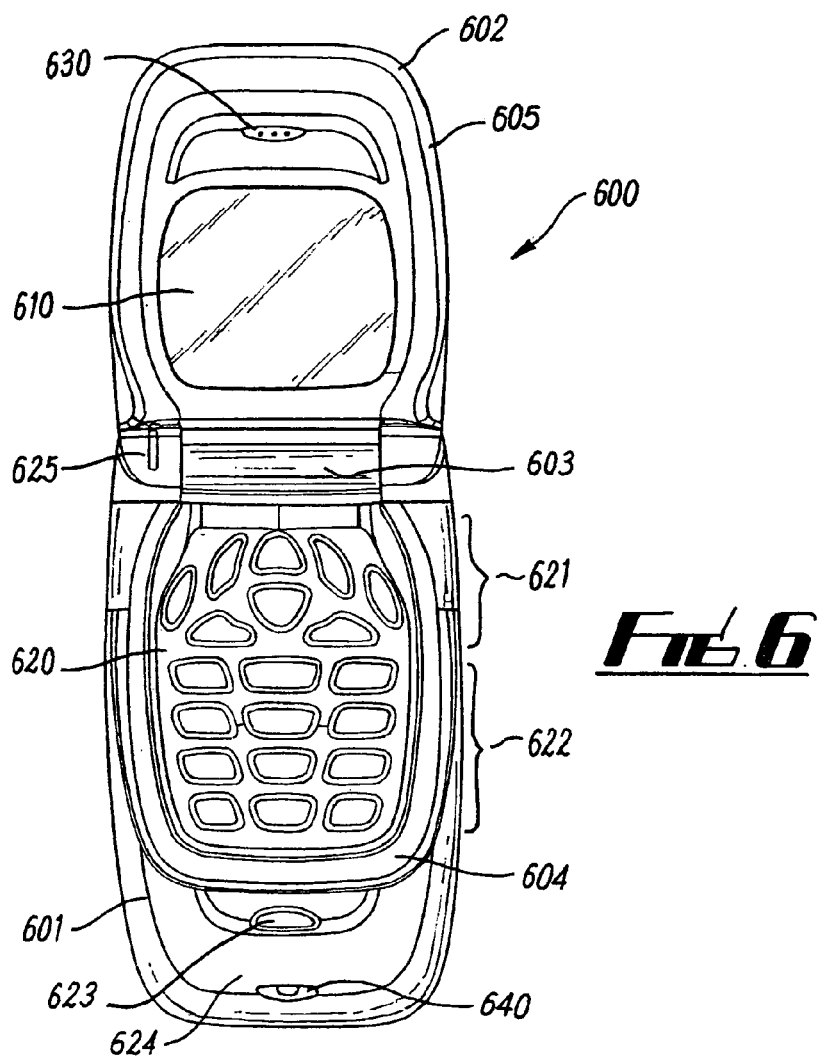
FIG. 6 is a front view of a two-part device, such as that of FIGS. 4A and 4B, shown in the open position.

FIGS. 4-6 illustrate a two-part electronic device such as a radio telephone according to an embodiment of the present invention. FIG. 4A illustrates a side view of the two-part device in the closed position. FIG. 4B illustrates a side view of the two-part device in the open position. The device has a first part 401 and a second part 402 which are connected via a hinge 403 and comprise fabric IMLs made up of fabric 420 covered polymer 410.

In the embodiment shown in FIGS. 4-6, the device has a continuous fabric surface 420 over both parts 401, 402, which provides an aesthetically pleasing result. The first part 401 has a first polymer portion 404 and a first fabric portion 421, which together form a removable cover or housing, whilst the second part 402 has a second polymer portion 405 and second fabric portion 422 which, in this embodiment, together form a battery cover. A third fabric portion 423 links the first and third fabric portions 421, 422 and covers the hinge. As can be seen in FIGS. 4A and 4B this third fabric portion 423 is sized such that it is taut when the device is closed.

The fabric portions 421 and 422 are attached to the first and second polymer portions 404, 405 by the FIML process illustrated in FIG. 7, and described below.

FIG. 5 shows a perspective view of a two-part device, such as that of FIG. 4, in a closed position. As can be seen from the Figure, in this embodiment, the two-part device 500 again has parts constituted by fabric IMLs. For example, the front cover is made up of a polymer 510, which is partially covered by fabric 520. As in the battery cover embodiment of FIG. 1, the front cover has a bottom and side edges, which are constituted of polymer and a central region, which is constituted of bonded fabric, and polymer. Like the FIG. 1 embodiment, the front cover may have a groove running along the interface between the visible portion of the polymer 510 and the edge of the fabric 520 to improve the edge quality of the visible fabric and to improve its protection from damage. However, in contrast to the FIG. 1 cover, the top edge of the front cover is covered by fabric. As mentioned with regard to FIG. 4, the fabric is continuous from the front to the rear of the device. In FIG. 5, an opening 530 is provided for a lanyard 540 or eyelet. This is preferably provided in the portion of the fabric 520 that covers the hinge.

FIG. 6 illustrates a front view of a two-part device, such as that of FIG. 4, shown in the open position. In this case, the two-part device is a portable telephone 600. The portable telephone 600 comprises a main body 601 pivotally connected to a flip 602 by a hinge 603. FIG. 6 shows the flip 602 in an open position in relation to the main body 601.

The main body 601 comprises a casing 604 that houses the main internal control circuitry of the telephone 600. The casing 604 carries a keypad 620 and power button 623, and forms, towards the front end a chin 624 below which is housed a microphone. A microphone port 640 is provided through the casing 604. The rear end of the upper casing upsweeps to a pair of knuckles 625 of the hinge 603. The keypad 620 comprises alphanumeric key 622 and function key 621 to provide conventional telephone operations.

The flip 602 likewise comprises a casing 605 which houses further electronic components such as an LCD 610, an earpiece 630, and associated circuitry.

The microphone and earpiece 630 are positioned at opposite ends of the two parts of the phone to maximise the distance between them, such that this distance approximates the distance between the ear and the mouth of the user.

With the flip 602 in the closed position, such as in FIG. 5, it covers the keypad 620 and its upper edge skirts the chin 624. In the open position of FIG. 6, the flip 602 is pivotally spaced from the main body 601 and the portable telephone 600 is ready for use.

FIG. 7 illustrates a cross-sectional view through the tool of a cavity label location system suitable for creating first and second polymer portions 404, 405 as illustrated in FIGS. 4A and 4B. A continuous fabric surface 420 extends over both parts 401, 402 and joins the parts via a fabric 'hinge' portion 423. The continuous fabric surface is formed from a single fabric laminate label 701.

The tool comprises a label location core 730, a mould cavity 720 and a mould core 710.

As in FIGS. 4A to 4C, when the label location core 730 and mould cavity 720 are moved towards the mould core 710, the label is held in position between the label location core 730 and mould core 710. This process may be similar to that described with reference to FIGS. 4A-4C, with the location core moving relative to the mould cavity so that projections 731 of the location core 730 and the mould core 710 co-operate to clamp the label 701 in position. The mould core 710 may have resiliently biased clamping ribs 714 for clamping the label 701.

The label location core 730 and the mould core additionally co-operate to define a 'shut-off' volume 750 into which injected polymer 740 cannot enter. As the projections 731 of the location core 730 and the mould core 710 co-operate to clamp the label in position, a projection 718 from mould core 710 clamps the label 701 against the label location core.

The projection 718 is continuous and forms a barrier to polymer 740 creating the 'shut-off' volume 750. The portion of the label 701 to one side of the shut-off volume 750 will be integrated into the first polymer portion 404 illustrated in FIGS. 4A and 4B and the label 701 on the other side of the shut-off volume 750 will be integrated into the second polymer portion 405 and the label 701 within the shut-off volume will form the interconnecting 'hinge' portion 423 of the continuous fabric surface 420.

Polymer 740 is then injected into the tool via injection barrels 212A and 212B on either side of the shut-off volume 750 until the polymer 740 has filled the space between the label location core 730, mould core 710 and the mould cavity 720 excluding the shut-off volume. This presses the label 701 against the end of the label location core 730. The polymer 740 bonds with the label 701, and they become, as a combination, the desired moulded polymer portions 404, 405 with the integrated continuous fabric surface 420 joining them together via the 'hinge' portion 423.

The label location core 730 is then moved away from the mould core 710.

The shut-off volume 750 may, for example, be of sufficient size to house a lanyard or eyelet 760 attached to the label 701.

The use of clamping in the above described methods enable a fabric label to be accurately and securely located within the injection moulding tool without marking or damaging the fabric.

Let us now turn to the other problem of how to create a three dimensional pre-form in a manner that does not form an undesirable artefact in the finished article such as marks on the fabric from cutting and an irregular boundary to the edge of the fabric.

Figure 8A:
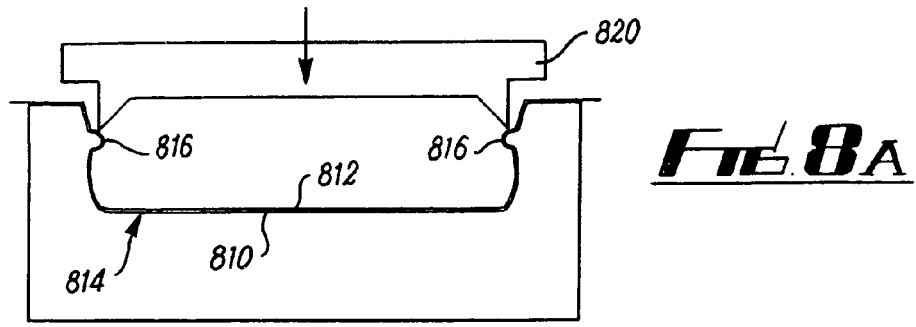
FIGS. 8A, 8B and 8C illustrate a 3D Fabric In-Mould Label process
Figure 8B:
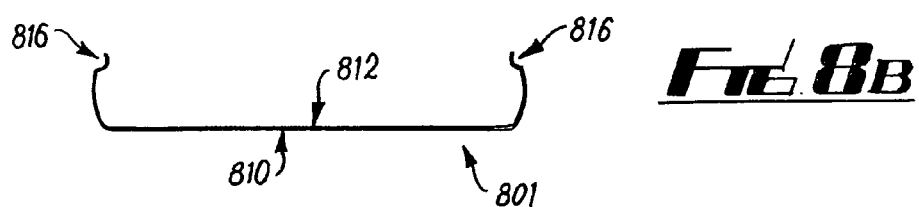
Figure 8C:
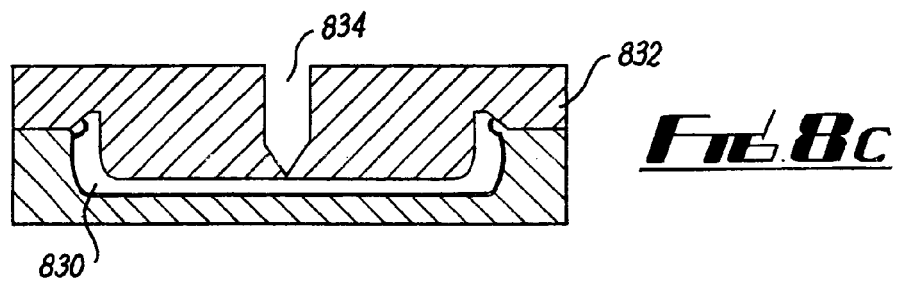
Figure 8D:
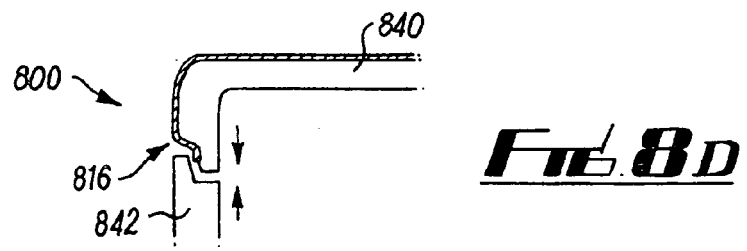
FIG. 8D illustrates an article formed by the process.

In order to avoid misalignment between the geometry of the injection moulded material and the edge of the label, the edge of the label 801 is hidden from view as illustrated in FIG. 8D in an assembled article 800.

FIGS. 8A, 8B and 8C illustrate a laminate performing, trimming and In-Mould Label process. In this process, a fabric layer 810 is laminated to a film substrate 812 to form a laminate 814. The laminate 814 is thermo-formed into a 3D shape using a vacuum and/or high pressure forming machine. The three-dimensional laminate 814 has a inwardly extending lip 816 feature that forms an indent in the exterior fabric surface of the formed laminate A pre-form label 801 is then cut, using a single axis hardened steel cutter 820, from the formed laminate 814 at the inwardly extending lip/indent feature 816 as illustrated in FIG. 8A. The cut is made at the lip/indent feature 816, which is a portion of the laminate that will be hidden when the formed article 600 is in use. The lip/indent feature 816 is retained in the pre-form label 801 as illustrated in FIG. 8B.

The lip/indent feature terminates the pre-form label 801. The lip/indent feature after cutting may only extend inwardly, or, as illustrated in FIG. 8B, it may extend inwardly and then downwardly to its terminus.

The pre-form label 801 has a substantially flat portion, sidewall portions and an inwardly extending lip/indent feature 816 that terminates the sidewalls.

The pre-form label 801 is then placed into a mould void 830 formed by an injection moulding tool 832. Material such as plastics or polymer is injected into the mould void via the conduit 834 and adheres to the film portion 812 of the laminate pre-form label 801. The pre-form label 801 may be held in place using clamping members (not shown) as described above.

The resultant article 840, an In-Mould Label (IML), is a moulded article with a lip/indent feature 816. The fabric surface 810 of the label pre-form 801 extends over the surface of the side wall of the article 840 and its edge terminates at a lip/indent feature 816. FIG. 8E illustrates the resultant article assembled into the housing a mobile cellular telephone. In the assembled housing, a portion 842 of the housing overlaps the lip/indent feature 816 and the edge of the label 801 is hidden from view as illustrated in FIG. 8D.

Figure 9:
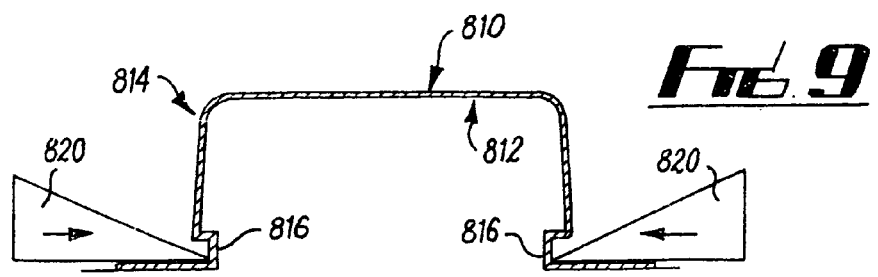
FIG. 9 illustrates a multi- axis cutting mechanism.

Although, a single axis cutting mechanism is illustrated in FIG. 8B, a multi-axis cutting mechanism may also be used as illustrated in FIG. 9.

Although the above FIML process has been described with reference to a particular example in which the fabric is Alcantara non-woven microfibre bonded to 0.2 millimetre polycarbonate film, it should be appreciated that other fabrics and films may be used. For example, woven, synthetic or natural fibres may be used for the fabric, although it may then be desirable to cut the pre-form using a heated cutter, an ultrasonic cutter or a laser. Alternatively, made-made fabric may be used. The currently preferred man-made fabric is Alacantara, however, Winter Komosho (polyester), Nylon and real leather may also be used although not as successfully.

Although embodiments of the invention have been described with reference to various examples, it should be appreciated that various modifications may be made thereto without departing from the spirit and scope of the invention.

We claim:

1. An In-Mould labelling apparatus comprising:
    a multi-portion body defining a mould void and at least one conduit for injecting material into the mould void;
    a flexible label located in the mould void; and
    a plurality of clamping members extending at least partially into the mould void, wherein the clamping members clamp the flexible label at its perimeter within the mould void.

2. An apparatus as claimed in claim 1, wherein the multi-portion body comprises a mould cavity, a label location core and a mould core arranged for relative movement and having a first injection configuration in which they cooperate to define the mould void and clamp the label within the mould void and a second non-injection configuration for releasing a moulded article.

3. An In-Mould labeling apparatus comprising:
    a multi-portion body defining a mould void and at least one conduit for injecting material into the mould void;
    a flexible label located in the mould void; and
    a plurality of clamping members extending at least partially into the mould void, wherein the clamping members are adapted to clamp the flexible label within the mould void,
    wherein the multi-portion body comprises a mould cavity, a label location core and a mould core arranged for relative movement and having a first injection configuration in which they co-operate to define the mould void and clamp the label within the mould void and a second non-injection configuration for releasing a moulded article, and wherein the label location core and the mould core are arranged to co-operate in the first injection configuration and define a shut-off volume into which injected material cannot enter.

4. An apparatus as claimed in claim 3, wherein the shut-off if volume is sized to house a lanyard or eyelet attached to the label.

5. An apparatus as claimed in claim 1, wherein the mould cavity and the mould core abut, in the first injection configuration, to define a portion of the mould void, and the label location core and the mould core abut, in the first injection configuration, to define a further portion of the mould void and clamp the label.

6. An apparatus as claimed in claim 5, wherein a portion of the mould cavity facing the mould core has cut-outs that provide for a particular shape of mould void.

7. An apparatus as claimed in claim 1, wherein the mould cavity has an opening, the clamping members extend from the mould core, and the label location core, in the injection configuration, extends through the opening towards the mould core and abuts the clamping members.

8. An In-Mould labelling apparatus comprising:
a multi-portion body defining a mould void and at least one conduit for injecting material into the mould void;
a label located in the mould void; and
a plurality of clamping members extending at least partially into the mould void, wherein the clamping members are adapted to clamp the label at its perimeter within the mould void,
wherein the mould cavity has an opening, the clamping members extend from the mould core, and the label location core, in the injection configuration, extends through the opening towards the mould core and abuts the clamping members, and further comprising a bias between the label location core and mould cavity resisting movement of the locating portion through the opening.

9. An apparatus as claimed in claim 8, further comprising a mechanism for moving the label location core towards the mould core.

10. An apparatus as claimed in claim 1, wherein the label location core has a projection or projections towards the mould core for clamping the label.

11. An apparatus as claimed in claim 10, wherein the projection is a continuous projection.

12. An apparatus as claimed in claim 1, wherein the clamping members are resiliently biased.

13. An apparatus as claimed in claim 1, wherein the label has a plurality of corners and one of the clamping members is positioned at each corner of the label.

14. An apparatus as claimed in claim 1, wherein each clamping member comprises gripping projections located where the clamping member abuts the label.

15. An In-Mould labelling apparatus comprising:
a multi-portion body defining a first mould void and at least one conduit for injecting material into the first mould void, a second mould void and at least one conduit for injecting material into the second mould void;
a label located in the first mould void;
means for placing the label so that it extends from the first would void to the second mould void; and
a plurality of clamping members extending at least partially into the first mould void, wherein the clamping members are adapted to clamp the label at its perimeter within the first mould void and a plurality of clamping members extending at least partially into the second mould void for clamping the label at its perimeter within the second mould void.

16. An apparatus as claimed in claim 15, wherein the multi-portion body further comprises a shut-off volume into which material is not injected, positioned between the first mould void and second mould void, wherein the placed label extends across the shut-off volume.

17. An apparatus as claimed in claim 1, wherein the clamping members are arranged to clamp the perimeter of the label such that material injected into the mould void deforms the label to press against the multi-portion body.

18. An apparatus as claimed in claim 1, wherein the label has a first side and a second side and the clamping members are arranged to clamp the perimeter of the label such that material injected into the mould void fills a space between the first side of the label and the multi-portion body and presses the second side of the label against the multi-portion body.

19. An apparatus as claimed in claim 1, wherein the clamping members and the multi-portion body are adapted to allow the flexible label to flex therebetween during injection of the material into the mould void.

20. An apparatus as claimed in claim 1, wherein the apparatus is adapted to encapsulate edges of the flexible label in a groove formed from the material injected into the mould void.

* * * * *

UNITED STATES PATENT AND TRADEMARK OFFICE
CERTIFICATE OF CORRECTION

| | |
|---|---|
| PATENT NO. | : 7,335,006 B2 |
| APPLICATION NO. | : 10/740035 |
| DATED | : February 26, 2008 |
| INVENTOR(S) | : Wilson et al. |

Page 1 of 1

It is certified that error appears in the above-identified patent and that said Letters Patent is hereby corrected as shown below:

IN THE CLAIMS:

In Claim 4:  Column 8, line 64, delete "if".

In Claim 15:  Column 10, line 9, delete "would" and insert --mould--.

Signed and Sealed this

Third Day of June, 2008

JON W. DUDAS
*Director of the United States Patent and Trademark Office*